United States Patent Office 3,008,995
Patented Nov. 14, 1961

3,008,995
BENZOPHENONE COMPOUNDS

Guenther K. Hoeschele and John J. Verbanc, Brandywine Hundred, Del., assignors to E. I. du Pont de Nemours and Company, Wilmington, Del., a corporation of Delaware No Drawing. Filed Dec. 19, 1958, Ser. No. 781,464
8 Claims. (Cl. 260—591)

This invention relates to novel benzophenone compounds and more particularly to benzophenones which are highly useful as photo stabilizers in that they absorb ultraviolet radiation.

There are many organic compounds which absorb light rays within the region of from 3000 to about 4000 A. units. Some of these compounds have been used to protect various materials or substrates which are sensitive to these rays by either directly incorporating them into the sensitive substrate or by applying them as a coating to its surface. Another method by which they may be used is to incorporate them into a second substrate, usually a transparent film which then functions as an ultraviolet filter and protects the first substrate. Many of these known photo stabilizer compounds have not been entirely satisfactory. One of the reasons for this is that they oftentimes absorb weakly in the wave length region where the harmful ultraviolet light rays exist. On the other hand, some of these compounds which have the property of absorbing strongly in the proper wave length region are usually so insoluble in the substrate that a proper amount of the compound cannot be incorporated therein to obtain the desired degree of protection.

It is an object of the present invention to provide novel benzophenone compounds. A further object is to provide benzophenone compounds which are highly useful as photo stabilizers in that they absorb ultraviolet radiation. A still further object is to provide a process for the preparation of these benzophenone compounds.

These and other objects of this invention are accomplished by the novel benzophenone compounds of the following formula:

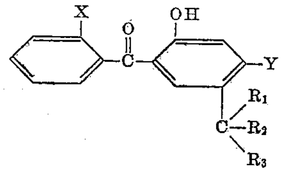

wherein X is hydrogen or hydroxy, Y is hydroxy or alkoxy of up to 20 carbon atoms, $R_1$ is hydrogen or lower alkyl and $R_2$ and $R_3$ are lower alkyl.

Representative examples of compounds falling within the scope of the present invention include 2,2',4-trihydroxy-5-isopropylbenzophenone;
2,2',4-trihydroxy-5-[1-(4-methyl-3-cyclohexenyl-isopropyl]-benzophenone;
5-tert-butyl-2,2',4-trihydroxybenzophenone;
5-tert-amyl-2,2',4-trihydroxybenzophenone;
5-(1,1-dimethylbutyl)-2,2',4-trihydroxybenzophenone;
5-(1,1,3,3-tetramethylbutyl)-2,2',4-trihydroxybenzophenone;
2,2'-dihydroxy-5-isopropyl-4-methoxybenzophenone;
4-dodecoxy-2,2'-dihydroxy-5-isopropylbenzophenone;
4-eicosoxy-2,2'-dihydroxy-5-isopropylbenzophenone;
5-tert-butyl-2,2'-dihydroxy-4-methoxybenzophenone;
4-pentoxy-5-tert-butyl-2,2'-dihydroxybenzophenone;
5-tert-butyl-4-dodecoxy-2,2'-dihydroxybenzophenone;
5-tert-amyl-4-ethoxy-2,2'-dihydroxybenzophenone;
5-tert-amyl-4-eicosoxy-2,2'-dihydroxybenzophenone;
2,4-dihydroxy-5-isopropylbenzophenone;
5-tert-amyl-2,4-dihydroxybenzophenone;

5-tert-butyl-2,4-dihydroxybenzophenone;
5-(1,1-dimethylbutyl)-2,4-dihydroxybenzophenone;
5-(1,1,3,3-tetramethylbutyl)-2,4-dihydroxybenzophenone;
2-hydroxy-5-isopropyl-4-methoxybenzophenone;
4-dodecyloxy-2-hydroxy-5-isopropylbenzophenone;
5-tert-butyl-2-hydroxy-4-methoxybenzophenone;
5-tert-butyl-4-dodecoxy-2-hydroxybenzophenone;
5-tert-butyl-4-eicosoxy-2-hydroxybenzophenone and 5-tert-amyl-2-hydroxy-4-methoxybenzophenone;
5-(1,1-dimethylbutyl)-2-hydroxy-4-methoxybenzophenone;
5-(1,1-dimethylbutyl)-4-hexoxy-2-hydroxybenzophenone and 5-(1,1,3,3-tetramethylbutyl)-4-dodecoxy-2-hydroxybenzophenone.

The novel benzophenones of the present invention may be prepared by alkylating a benzophenone of the formula

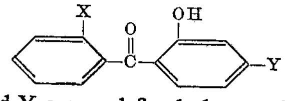

wherein X and Y are as defined above, with a terminally unsaturated hydrocarbon such as isobutylene or 2-methylbutene-1 in the presence of an acidic catalyst. The alkyl group is introduced at the 5 position into the ring bearing the hydroxy group and the Y substituent. In the compounds having an alkoxy group in the 4 position, it is preferable to alkylate the corresponding 4 hydroxy compound with the unsaturated hydrocarbon so as to introduce the alkyl group at the 5 position, and then etherify the 4 hydroxy group by conventional methods.

The alkylation of the benzophenone should be carried out at temperatures from 60° to 80° C. with a temperature of 65° to 75° C. being preferred. The unsaturated hydrocarbon is introduced over a period of from about 1 to 5 hours into a well-agitated mixture containing the benzophenone, the acidic catalyst and an inert hydrocarbon or a chlorinated hydrocarbon solvent. This solvent dissolves the benzophenone during the alkylation. From about 1 to about 3 mols of unsaturated hydrocarbon per mol of benzophenone should be employed. However, it is to be understood that only one alkyl group is introduced into the benzophenone structure, and that occurs at the 5 position, whether or not a molar excess of the unsaturated hydrocarbon is used. After all of the unsaturated hydrocarbon has been introduced agitation may be continued in order to insure that the alkylation is complete. The resulting mixture is then cooled to room temperature and neutralized with aqueous sodium bicarbonate. The organic phase is then treated and concentrated under vacuum to yield the desired alkylated benzophenone product. In the event that the product is insoluble in the cold reaction mixture, it may be collected by filtration and washed acid-free with dilute aqueous sodium bicarbonate and water.

In carrying out the process for the preparation of these novel benzophenone compounds, benzene is the preferred inert solvent. About 50 to 300 parts by weight is used for every 100 parts by weight of the benzophenone compound to be alkylated. It is to be understood that the amount of solvent used will depend on the particular benzophenone compound employed. For example, at least about 140 parts of benzene is supplied for every 100 parts of 2,2',4-trihydroxybenzophenone but 50 parts of benzene will suffice for every 100 parts of 2-hydroxy-4-methoxybenzophenone. Other inert solvents which may be used include aromatic hydrocarbons such as toluene, m-xylene, halogenated aromatic hydrocarbons such as o-dichlorobenzene and halogenated aliphatic hydrocarbons such as carbon tetrachloride.

p-Toluene sulfonic acid and sulfuric acid are particularly useful catalysts. The catalyst preferred and the amount used will depend on the benzophenone compound being alkylated. For example, when 2,2',4-trihydroxybenzophenone is alkylated, concentrated sulfuric acid is preferred; at least 3 parts by weight (preferably 5 parts) is used for every 100 parts by weight of the benzophenone when isobutylene is the alkylating agent but 10–15 parts by weight is preferably employed when higher olefins such as 2-methyl-butene-1 are used; optionally, 10, preferably 20, parts of p-toluene sulfonic acid is used. However, when 2,4-dihydroxybenzophenone is alkylated, p-toluene sulfonic acid (at least 15 parts, preferably 20 to 30 parts) is the better catalyst; sulfuric acid may be used, alternatively (at least 10 parts). The amount of catalyst to be used will be more particularly illustrated in the following examples.

The conversion of 5-alkyl-2,4-dihydroxybenzophenones (or the 5-alkyl-2,2',4-trihydroxybenzophenones) to the corresponding 4-alkoxy compounds is accomplished by conventional etherification procedures familiar to those skilled in the art. For example, the 4-methoxy compounds are made by forming the potassium salt of the 4-hydroxyl group and reacting with dimethyl sulfate. Higher alkoxy derivatives are made by the Williamson synthesis using primary alkyl halides (preferably the bromides) in a polar solvent such as methyl ethyl ketone; temperatures above 50° C. are preferred in order to attain a convenient reaction rate. Suitable procedures are described in U.S. Patents 2,853,521 and 2,693,492.

The alkylation process of this invention results in the introduction of an alkyl group in the 5 position on the ring in the benzophenone compound which bears the hydroxy substituent and the Y substituent. The alkyl substituent which is introduced at this 5 position may be represented by the structure

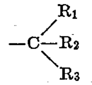

wherein $R_1$, $R_2$ and $R_3$ are as defined above. It is to be understood that the term "lower alkyl" includes alkyl groups of up to about 8 carbon atoms. Representative terminally unsaturated hydrocarbons which may be used in the process include isobutylene; 2-methylpentene-1; 2-methylbutene-1; 2,4,4-trimethylpentene-1.

As mentioned above the novel alkylated benzophenones of the present invention are highly useful photo stabilizers in that they can be incorporated with a wide variety of substrates to absorb ultraviolet radiation. It has been determined that the introduction of the alkyl group in the 5 position of the benzophenone compound significantly increases the ultraviolet absorption of this compound as compared with the corresponding unalkylated benzophenone. It has been determined that the introduction of the alkyl group in the 5 position results in a bathochromic effect which is a shift of absorption maximum to longer wave lengths. As a result of the benzophenone compounds of the present invention being much more effective photo stabilizers than the corresponding unalkylated materials, on a weight basis, they provide much more effective protection at a lower cost. Furthermore, the absorption of the subject compounds above 4400 A. (visible region of the spectrum) is so low that they introduce hardly any color into the substrates in which they are present. For example, comparison of a plot of percent transmission versus wave length for a solution of 250 mg. of 2,2',4-trihydroxybenzophenone in methanol with an analogous plot for a solution of 125 mg. of 5-tert-butyl-2,2',4-trihydroxybenzophenone in methanol shows that the latter, a representative subject compound, can introduce less color and yet be a more effective ultraviolet absorber than the unalkylated compound. Similar results are noted when comparing other representative subject compounds such as 5-tert-butyl-2,4-dihydroxybenzophenone and 5-tert-butyl-2-hydroxy-4-methoxybenzophenone with the corresponding benzophenones unalkylated in the 5-position. Finally, the subject compounds which are alkylated in the 5-position display greatly improved solubility in substrates of low polarity. Evidence of this change is given by the following table:

SOLUBILITY OF BENZOPHENONES IN n-OCTANE AT 22° C.

| Compound: | Solubility [1] |
|---|---|
| 2-hydroxy-4-methoxybenzophenone | 4.5 |
| 5-tert-butyl-2-hydroxy-4-methoxybenzophenone | 64 |

[1] Grams of benzophenone compound/100 g. solvent.

The novel benzophenones of the present invention are significantly useful as novel ultraviolet screening agents. They can be incorporated into fibers, films and coatings. Thus, these compounds can be used in polar elastomers such as neoprene, copolymers of 1,3-butadiene and styrene and polyurethanes. They can be used with polar plastics, such as polymethyl methacrylate, cellulose, esters, polyesters, polyesteramides and polyamides. When these benzophenone compounds are applied to these various polymeric substrates, they may be used as a solution or a dispersion, or as a liquid in the form of a melt, or as a solid in the form of a powder or dust. The substrate itself may be in solution, a solid or may be a liquid in the form of a melt. In using these novel benzophenone compounds with the substrates they may be added at any stage during the preparation of the particular substrate provided they do not interfere with the process so as to adversely affect the physical properties of the resulting product and provided they are not transformed during the process of the preparation of the substrate. For example, when it is desired to protect linear high molecular weight polyesters or polyurethanes, it is preferred to introduce the subject compounds after polymer chain extension has been completed.

The novel 5-alkyl-2,2',4-trihydroxy or 5-alkyl-4-alkoxy-2,2'-dihydroxy compounds of the present invention are particularly useful in the photo-stabilization of polyurethane compositions which have been prepared from various polyols and polyisocyanates. It has been determined that a combination of these benzophenones with certain promoters such as selected hindered phenols, when incorporated into a polyurethane composition, bring about a significant improvement in protecting the composition against photo degradation. Representative promoters are: 2,2'-methylene-bis(6-tert-butyl-4-methylphenol); 4,4'-butylidine-bis(2-tert-butyl-5-methylphenol); 2-benzyl-6-tert-butyl-4-methylphenol; 2,6-diisopropyl-4-methylphenol; 2-tert-butyl-4,6-dimethylphenol and N-phenyl-beta-naphthylamine.

The following examples will better illustrate the nature of the present invention; however, the invention is not intended to be limited to these examples. Parts are by weight unless otherwise indicated.

The tensile strength ($T_B$), extension at break ($E_B$) and modulus at 300% extension ($M_{300}$) are determined at 25° C. in accordance with ASTM procedure D412–51T.

The aging caused by exposure to ultraviolet light is carried out in a color fadeometer operated according to tentative test method 16A–54 (1955 Technical Manual and Year Book of the American Association of Textile Chemists and Colorists, vol. XXXI, pp. 79–82).

*Example 1*

13.2 parts of 2,2',4-trihydroxybenzophenone, 66 parts of benzene, and 5 parts of p-toluene sulfonic acid are heated to 65° C. while agitated. Nitrogen is introduced to displace air. Then 68.1 parts of isobutylene is introduced with stirring into the mixture over a 2-hour period while the temperature is maintained at 65–70° C. by application of external cooling. The mixture is cooled to room temperature and diluted with 50 parts of ethyl acetate. The solution is shaken with 3 portions of water, neutralized with a dilute sodium bicarbonate solution, dried over anhydrous magnesium sulfate, and concentrated under vacuum to yield 11.5 parts of 5-tert-butyl-2,2',4-trihydroxybenzophenone.

The absorption maximum of this compound in methanol has a molar extinction coefficient of 10,500 and occurs at 3340 A. When the compound is dissolved in toluene the absorption maximum occurs at 3590 A.

*Example 2*

109.6 parts of 2,2',4-trihydroxybenzophenone, 198 parts of benzene, and 5.4 parts of concentrated sulfuric acid are heated to 70° C. while agitated. After air has been displaced by a nitrogen sweep, 32.9 parts of isobutylene is introduced over a 2-hour period while the temperature is held at 70° C. The mixture is then cooled to 0° C. The precipitated crystals are collected by filtration, free from acid by water washes, and dried under vacuum. 111.3 parts of 5-tert-butyl-2,2',4-trihydroxybenzophenone is obtained.

To 235 parts of the filtrate is added with stirring 44 parts of benzene, 82.9 parts of 2,2',4-trihydroxybenzophenone and 3.6 parts of concentrated sulfuric acid. Over a 1.5-hour period at 70° C. 20.2 parts of isobutylene is then introduced with agitation. On cooling the mixture, 77 parts of product is precipitated (M.P. 175–180° C.) and collected by filtration. To the filtrate is added 110 parts of trihydroxybenzophenone and 1.8 parts of concentrated sulfuric acid. Over a 2-hour period 35.8 parts of isobutylene is introduced while the temperature is maintained at 70° C. On cooling to 0° C., 123.4 parts (90% of theory) of crude product is obtained melting 178–182° C.; after recrystallization from methanol it melts at 194–196° C.

*Example 3*

20 parts of 2,2',4-trihydroxybenzophenone, 39.5 parts of benzene, and 2.7 parts of concentrated sulfuric acid are heated to 70° C. in a reaction vessel which has been freed from air by a nitrogen sweep. Over a 3-hour period 9 parts of 2-methyl-butene-1 is introduced with stirring while the temperature is kept at 70° C. After agitation for an additional hour at 70° C., the mixture is cooled to room temperature, neutralized with aqueous sodium bicarbonate, dried over anhydrous magnesium sulfate, and concentrated under vacuum to yield 21.3 parts (81.6% of theory) of a crystalline 5-tert-amyl-2,2',4-trihydroxybenzophenone, melting at 142–144° C.

The absorption maximum of this compound (0.0181 mg./ml. concentration in methanol) has a molar extinction of 10,000 and occurs at 3330 A.

*Example 4*

35 parts of 2,2',4-trihydroxybenzophenone, 62 parts of benzene, and 4.5 parts of concentrated sulfuric acid are mixed and heated to 70° C. in a reaction vessel which has been freed from air by a nitrogen sweep. Over a 5½ hour period 18 parts of 2-methylpentene-1 is introduced with stirring while the temperature is kept at 70° C. After agitation for an additional half-hour at 70° C., the mixture is cooled to room temperature, neutralized with aqueous sodium bicarbonate, dried over anhydrous magnesium sulfate, and concentrated under vacuum to yield 26.4 parts of crystalline 5-(1,1-dimethylbutyl)-2,2',4-trihydroxybenzophenone melting at 125° C. (after recrystallization from aqueous methanol).

The absorption maximum of this compound (0.0182 mg./ml. concentration in methanol) has a molar extinction coefficient of 10,150 and occurs at 3335 A.

*Example 5*

A. *Preparation of isocyanate-terminated polyurethane polymer A.*—278.7 parts of toluene-2,4-diisocyanate and 1000 parts of anhydrous polytetramethyleneether glycol (molecular weight 1000) are agitated at 80° C. for 4 hours in a dry reaction vessel protected from atmospheric moisture. Polymer A thus obtained has a free isocyanate content of 4.2%, a Brookfield viscosity at 30° C. of about 16,500 cps., and a number-average molecular weight of about 2000.

B. To 100 parts of polymer A at 60–80° C. is added with stirring 1 part of 5-tert-butyl-2,2',4-trihydroxybenzophenone. The mixture thus prepared is cast as a film 14 to 18 mils thick which is cured by exposure for a week to ambient atmospheric moisture vapor in the absence of direct sunlight.

C. The procedure of part B above is repeated except that 1 part of 2,2',4-trihydroxybenzophenone is substituted for 1 part of 5-tert-butyl-2,2',4-trihydroxybenzophenone.

D. The procedure of part C above is repeated except that 2 parts of 2,2',4-trihydroxybenzophenone are used instead of 1 part.

E. Films B, C and D prepared above are aged in a fadeometer. Testing of films C and D is stopped after 90 and 110 exposure hours, respectively, since less than about a third of the original tensile strength remains. Aging of film B is continued for a total of 140 exposure hours. Table V below gives the data obtained.

TABLE V

| Exposure hours | Film B $T_B/E_B/M_{300}$ | Film C $T_B/E_B/M_{300}$ | Film D $T_B/E_B/M_{300}$ |
|---|---|---|---|
| 0 | 5400/580/1070 | 5800/550/1120 | 5500/590/1030 |
| 60 | | 4850/660/1000 | |
| 80 | 4700/640/960 | 2850/720/825 | 5100/700/970 |
| 90 | | 1700/700/750 | |
| 100 | | (1) | 3100/710/930 |
| 110 | | | 920/340/900 |
| 120 | 3800/680/925 | | (1) |
| 130 | 3650/700/760 | | |
| 140 | 1700/660/750 | | |

[1] Testing discontinued.

*Example 6*

35 parts of 2,2',4-trihydroxybenzophenone, 70.5 parts of benzene, and 5.4 parts of concentrated sulfuric acid are mixed and heated to 70° C. in a reaction vessel which has been freed from air by a nitrogen sweep. Over an 8-hour period 22.5 parts of 2,4,4-trimethylpentene-1 is introduced with stirring while the temperature is kept at 70° C. After agitation at 70° C. for an additional hour, the mixture is cooled to room temperature, neutralized with aqueous sodium bicarbonate, dried over anhydrous magnesium sulfate, and concentrated under vacuum to yield 30 parts of 5-(1,1,3,3-tetramethylbutyl)-2,2',4-trihydroxybenzophenone melting at 165–168° C. (after recrystallization from aqueous methanol).

The absorption maximum of this compound (0.0178 mg./ml. concentration in methanol) has a molar extinction coefficient of 9,800 and occurs 3360 A.

*Example 7*

45.6 parts of 2,4-dihydroxybenzophenone, 132 parts of benzene, and 15 parts of a solution of p-toluene sulfonic acid are heated to 65° C. while agitated. Nitrogen is introduced to displace air. Then 30 parts of isobutylene is bubbled steadily into the agitated mixture during a 3¼ hour period while the temperature is maintained at 65° C. by application of external cooling. The mixture is cooled to room temperature and neutralized with aqueous sodium bircarbonate; the organic layer is separated and subsequently washed with 250 parts of water. The wash water is separated and twice extracted with 88 parts of benzene. The organic phases are combined, dried over anhydrous magnesium sulfate and subsequently concentrated under vacuum to yield 53 parts of 5-tert-butyl-2,4-dihydroxybenzophenone as a yellowish crystalline solid melting at 141° C.

The absorption maxima of this compound (0.0162 mg./ml. concentration in methanol) have molar extinction coefficients of 16,900 and 12,060 and occur at 2920 A. and 3330 A., respectively.

*Example 8*

45.75 parts of 2-methyl-butene-1 is introduced over a 4.5-hour period to a well-agitated mixture maintained at 75° C. and consisting of 50 parts of 2,4-dihydroxybenzophenone, 88 parts of benzene, and 15 parts of p-toluene sulfonic acid. Agitation is continued at 75° C. for a half-hour. The mixture is then cooled to room temperature and neutralized with a dilute sodium bicarbonate solution. After evaporation of the solvent 49.6 parts of an organic crystalline solid precipitates. After crystallization from methanol pure 5-tert-amyl-2,4-dihydroxybenzophenone is obtained melting at 116° C.

The 5-tert-amyl-2,4-dihydroxybenzophenone obtained has an absorption maximum (0.0200 mg./ml. concentration in methanol) at 3340 A.

*Example 9*

27 parts of 5-tert-butyl-2,4-dihydroxybenzophenone, 13.8 parts of potassium carbonate, and 60 parts of methyl ethyl ketone are agitated at reflux for 5 hours. Then over a 3-hour period 13 parts of dimethyl sulfate is introduced with stirring. 40 parts of methyl ethyl ketone is added to lower the viscosity of the reaction mixture. After 2 more hours at reflux, the mixture is cooled to room temperature and the inorganic salts are removed by filtration. The filtrate is poured into water, the pH is adjusted to a value of 5–6 by addition of dilute hydrochloric acid, and the precipitated solids are collected by filtration, washed with water, and dried under vacuum. Recrystallization of the solids from methanol gives 23 parts of 5-tert-butyl-2-hydroxy-4-methoxybenzophenone melting at 93° C.

*Analysis.*—Calcd. for $C_{18}H_{20}O_3$: C, 76.03; H, 7.09. Found: C, 76.04; H, 7.10.

The absorption maximum of this compound (0.0169 mg./ml. in methanol) has a molar extinction of 8,900 at 3550 A.

*Example 10*

28.6 parts of 5-tert-butyl-2,2',4-trihydroxybenzophenone, 13.8 parts of potassium carbonate, and 80 parts of methyl ethyl ketone are agitated at reflux for 4 hours. Then over a one-hour period 13 parts of dimethyl sulfate is introduced with stirring. 72 parts of methyl ethyl ketone is added and the mixture is agitated at reflux for 2½ hours more. It is cooled and treated as described in Example 9 above. Recrystallization of the solids from methanol gives 28 parts of 5-tert-butyl-2,2'-dihydroxy-4-methoxybenzophenone melting at 116.5° C.

*Analysis.*—Calcd. for $C_{18}H_{20}O_4$: C, 71.98; H, 6.71. Found: C, 71.75; H, 7.15.

The absorption maximum of this compound (0.015 mg./ml. in methanol) has a molar extinction coefficient of 9860 occurring at 3350 A.

*Example 11*

28.6 parts of 5 - tert - butyl - 2,2',4 -trihydroxybenzophenone, 13.8 parts of potassium carbonate, and 80 parts of methyl ethyl ketone are agitated at reflux for 4 hours. Then 24.9 parts of lauryl bromide is quickly introduced. The mixture obtained is agitated at reflux for the next 16 hours. It is cooled and treated as described in Example 9 above. Recrystallization of the solids from methanol gives 40 parts of 5-tert-butyl-4-dodecoxy-2,2'-dihydroxybenzophenone melting at 81° C.

*Analysis.*—Calcd. for $C_{29}H_{42}O_4$: C, 76.61; H, 9.31, Found: C, 76.62; H, 9.24.

The absorption maximum of this compound (0.0258 mg./ml. in methanol) has a molar extinction coefficient of 10,770 occurring at 3350 A.; in isooctane the maximum has a value of 13,600 and occurs at 3595 A.

*Example 12*

To 27 parts of 5-tert-butyl-2,4-dihydroxybenzophenone dissolved in 60 parts of methyl ethyl ketone is added with stirring 13.8 parts of potassium carbonate. The mixture is heated to 80° C. and agitated at 80–82° C. for 4.5 hours. To the potassium salt thereby obtained is added 24.9 parts of dodecyl bromide. The mixture is refluxed while agitated at 80–82° C. for 16 hours. It is then cooled to room temperature and filtered to remove the precipitated potassium bromide. The filtrate is subsequently poured into an excess of water. The precipitated 5 - tert - butyl - 4 - dodecyloxy - 2 - hydroxybenzophenone is recrystallized from a mixture of methanol and ligroin. A 75% yield of product is obtained melting at 74.5–75.5° C. The compound (2.58 mg./100 ml. methanol) has a molar extinction coefficient of 7860 at 3360 A.

As many widely different embodiments of this invention may be made without departing from the spirit and scope thereof, it is to be understood that this invention is not limited to the specific embodiments thereof except as defined in the appended claims.

What is claimed is:

1. The benzophenone compounds having the formula

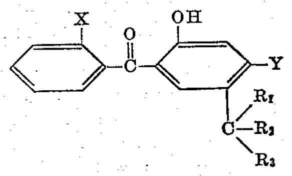

wherein X is a radical selected from the group consisting of hydrogen and hydroxy, Y is a radical selected from the group consisting of hydroxy and alkoxy having no more than 20 carbon atoms, and

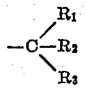

is a radical selected from the group consisting of tertiary butyl, tertiary amyl, 1,1-dimethylbutyl and 1,1,3,3-tetramethylbutyl.

2. The benzophenone compounds according to claim 1 wherein the

radical in the 5-position is a tertiary butyl radical.

3. 5-tert-butyl-2,4-dihydroxybenzophenone.

4. 5-tert-butyl-2,2',4-trihydroxybenzophenone.

5. The compounds according to claim 2 wherein X is hydrogen and Y is alkoxy.

6. 5-tert-butyl-4-dodecoxy-2-hydroxybenzophenone.

7. The compounds according to claim 2 wherein X is hydroxy and Y is alkoxy.

8. 5 - tert - butyl - 2,2' - dihydroxy - 4 - methoxybenzophenone.

References Cited in the file of this patent

UNITED STATES PATENTS

| | | |
|---|---|---|
| 2,773,903 | Hardy et al. | Dec. 11, 1956 |
| 2,861,053 | Lappin et al. | Nov. 18, 1958 |

OTHER REFERENCES

Kulka: J. Am. Chem. Soc., vol. 76, pp. 5469–71 (1954).

Murai: Chem. Abstracts, vol. 50, p. 981 (1956).